DISC PACK LOCKING MECHANISM

Filed April 15, 1968 2 Sheets-Sheet 1

Inventor:
Andrew McKelvey, Jr.
By Bair, Freeman & Molinare
Attys.

DISC PACK LOCKING MECHANISM

Filed April 15, 1968 2 Sheets-Sheet 2

Inventor:
Andrew McKelvey, Jr.
By Bair, Freeman & Molinare
Attys.

3,465,875
DISC PACK LOCKING MECHANISM

Andrew McKelvey, Jr., La Grange Park, Ill., assignor to Amerline Corporation, a corporation of Illinois
Filed Apr. 15, 1968, Ser. No. 721,395
Int. Cl. B65d 85/30, 85/67
U.S. Cl. 206—62 5 Claims

ABSTRACT OF THE DISCLOSURE

A locking mechanism for locking the top and bottom parts of a complete disc pack container. The locking mechanism includes a male segment which extends from the top part and is adapted to slidably engage a female segment extending from the bottom part. The male segment includes a spring biased cam pin which is engaged and displaced by a relatively fixed second pin extending from the female segment. Retaining elements projecting from the male segment are forced by the displaced cam pin into locking engagement to a retaining ring of the female segment to hold the parts together. To disconnect the segments, the second pin is disengaged from the cam pin which, in turn, disengages the retaining elements thereby allowing the retaining elements to disengage the retaining ring.

Background of the invention

This invention relates to the improvement in a computer disc pack container of a locking mechanism to hold the top and bottom of the container together for protection of the discs against abrasion and dust.

Storage of information on computer tape reels for subsequent use with a computer is well known. This method of storage of information on reels of magnetic tape, however, has some disadvantages. For example, information which is stored on segments of tape near the center of the reel cannot be easily and instantly retrieved. For this reason, recent computer storage information systems have made use of discs on which information is stored in a manner analogous to the recording or storage of sound on phonograph record discs. Thus, to retrieve information kept near the center of the disc, one merely positions the computer pickup stylus near the center of the disc.

With the use of discs as with the use of magnetic tape, it has been found that dust and other particles can easily disrupt the flow of information from the disc into a computer. It is well known that this misreading of information or "drop out" is one of the serious problems encountered in transmitting information from discs into a computer.

To counteract "drop out," disc containers have been utilized. These are generally cylindrical containers which are adapted to receive a plurality of discs on a central hub. The containers are generally comprised of a saucer-shaped top part with sides that more or less completely surround the disc, and a saucer-shaped bottom part which mates with the top part to provide an air-tight, dust proof seal. When the discs are not being used, they are stored in the closed containers. When it is deemed desirable to use the discs with a computer, the bottom part of the container cover is removed and the top part of the cover with the discs still mounted within the interior of the container is merely coupled with the computer.

Generally the top and the bottom parts of such a container are connected with one another by means of a plastic or nylon knob which passes through an opening in the center of the bottom part and screws onto a threaded metal spindle extending from the center of the top part of the container. The metal spindle is a considerably harder material than the plastic material used in the knob. Because of the difference in hardness of these materials, the threads on the internal portion of the plastic knob become easily stripped and do not provide an adequate grasp between the top and bottom parts of the container. As the threads become stripped, minute dust particles are created which become deposited on discs and cause "drop out" or misreading of information.

To attach the container top and disc to a computer, the knob is unthreaded from the spindle and the bottom part of the container removed. The threaded spindle is then rotated or coupled with the computer. It is during the threading or unthreading operation of the knob and spindle that dust particles contaminate the information stored on the computer discs.

From the previous discussion it can be seen that a dust free locking mechanism is desirable. However, it is also desirable to provide a dust free locking mechanism with a minimum of modifications to prevent disc containers. This is necessary to avoid expensive alteration or modification of the multitude of computer discs and computers presently in use. The problem of providing a dust free container for existing computer discs and computers is therefore the subject matter of the present invention.

Summary of the invention

In a principal aspect the present invention is the improvement of a locking mechanism for a computer disc container of the type having a separable top and bottom with an improved latching mechanism to secure interconnection between the top and the bottom. The improved latching mechanism includes a male segment which extends from the center of the top part and is adapted to engage a female segment extending from the center of the bottom part so that a retaining element in the male segment locks against a retaining flange in the female segment when the two parts are joined together. Means are provided to disengage the retaining element from the flange when the parts are to be separated.

It is thus an object of the present invention to provide an improved locking mechanism for a computer disc container.

It is a further object of the present invention to provide an improved locking mechanism which requires a minimum of modification to existing manufactured disc containers.

One further object of the present invention is to provide an improved locking mechanism which is economical to manufacture and which provides a secure seal of the container parts.

Still another object of the present invention is to provide an improved locking mechanism which prevents the manufacture and collection of dust on the computer discs.

These and other objects, advantages and features will be more fully set forth in the detailed description which follows.

Brief description of the drawings

In the detailed description which follows reference will be made to the drawings comprised of the following figures.

Description of the preferred embodiment

Figure 1:
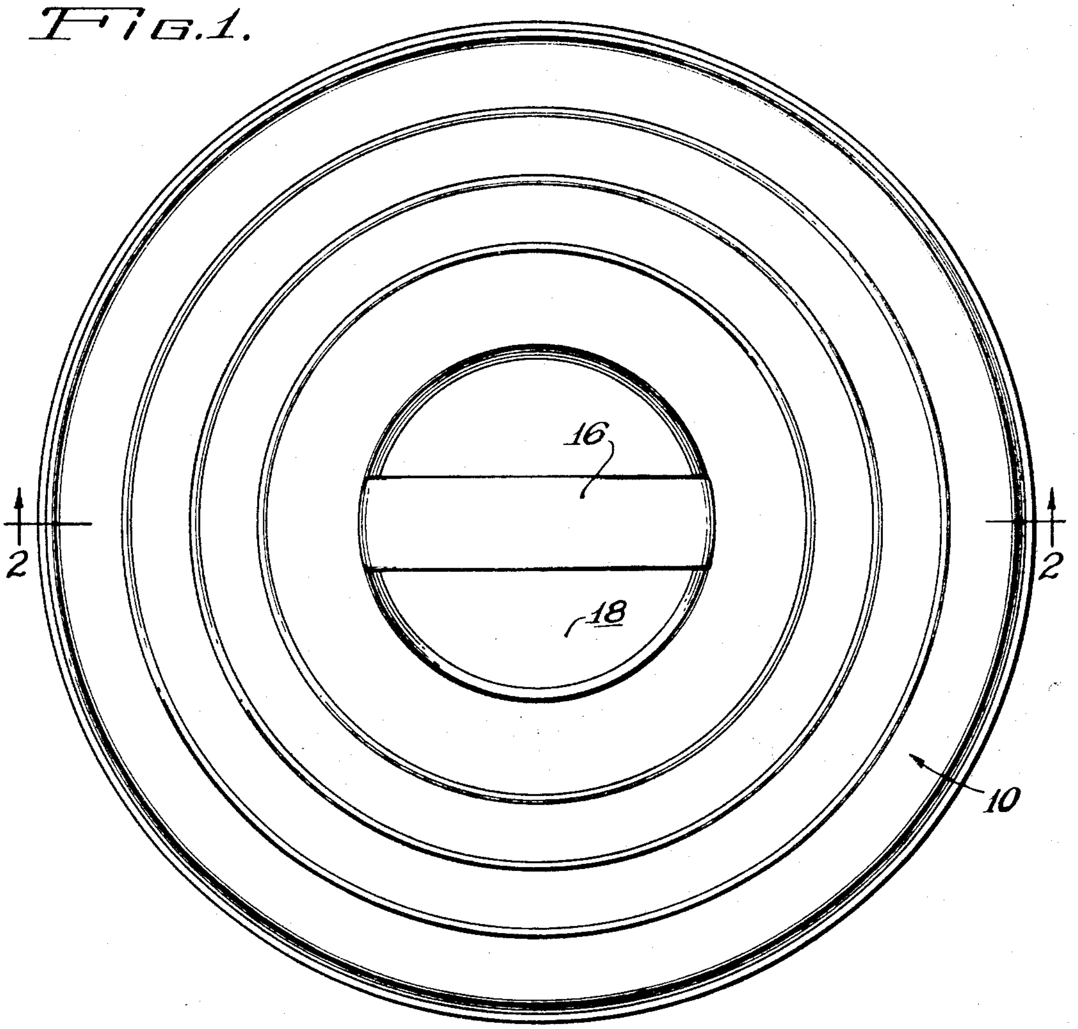
FIG. 1 is a top plan view of the improved disc container of the invention.
Figure 2:
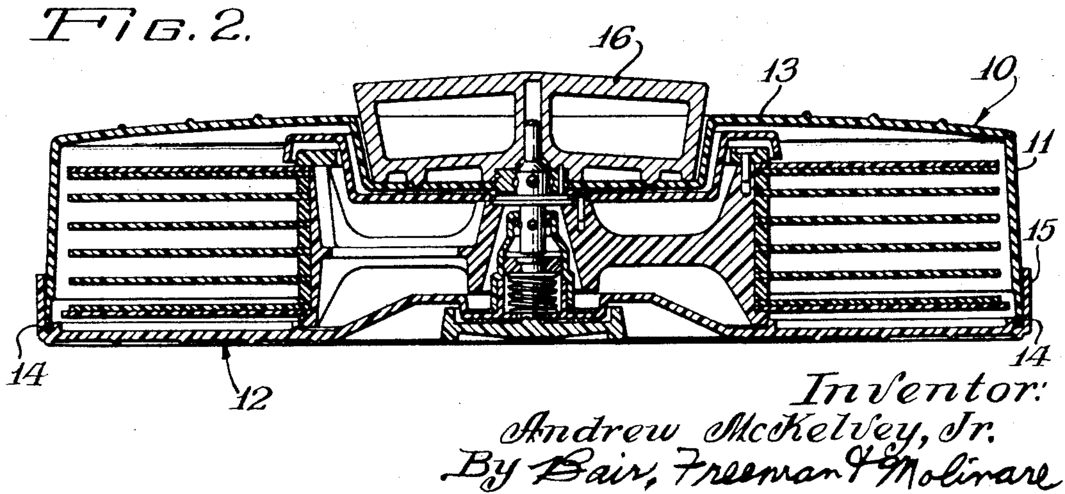
FIG. 2 is a cross-sectional view taken substantially along the lines 2—2 of FIG. 1 and illustrates the improved locking mechanism.

FIGS. 1 and 2 illustrate a disc pack container of the type presently used with many computers. The disc pack container also includes the improvement of the presently claimed invention. The container is comprised of a top part or cover 10 and a bottom part or cover 12. The top cover 10 is preferably fabricated from a clear styrene and includes a circumferential side wall 11 as well as a top wall 13. The bottom cover 12 is preferably formed from A.B.S. plastic material and includes a circumferential flange 15. A rubber gasket 14 is positioned in a slot around the inner circumference of the bottom cover 12 so that when the top cover 10 and the bottom cover 12 are mated, as illustrated in FIG. 2, a dust proof protective seal is effected. A stainless steel handle 16 is affixed in a cavity 18 defined in the central portion of the top wall 13.

The top cover 10 is interconnected with the bottom cover 12 by interconnecting means comprised generally of a male segment 20 projecting from the top cover 10 interconnected with a female segment 22 projecting from the bottom cover 12. Positioned on the inside of the disc pack container and attached to the top cover 10 is a disc holder 24. Disc holder 24 engages the inside walls defining cavity 18. Also shown in FIG. 2 are a plurality of computer discs 25 through 30 mounted on the disc holder 24.

In operation the bottom cover 12 is separated from the top cover 10, then the top cover 10, along with the included discs 25, is attached to the computer. The top cover 10 thus serves to protect the discs 25 while they are being used in cooperation with the computer.

Figure 3:
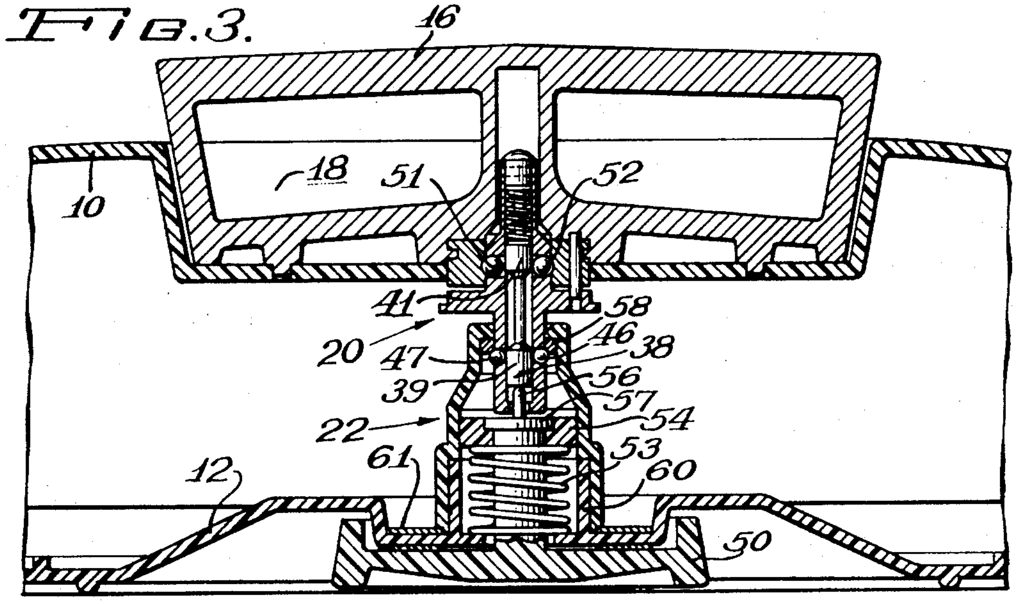
FIG. 3 is an enlarged cross-sectional view of the locking mechanism as illustrated in FIG. 2.
Figure 4:
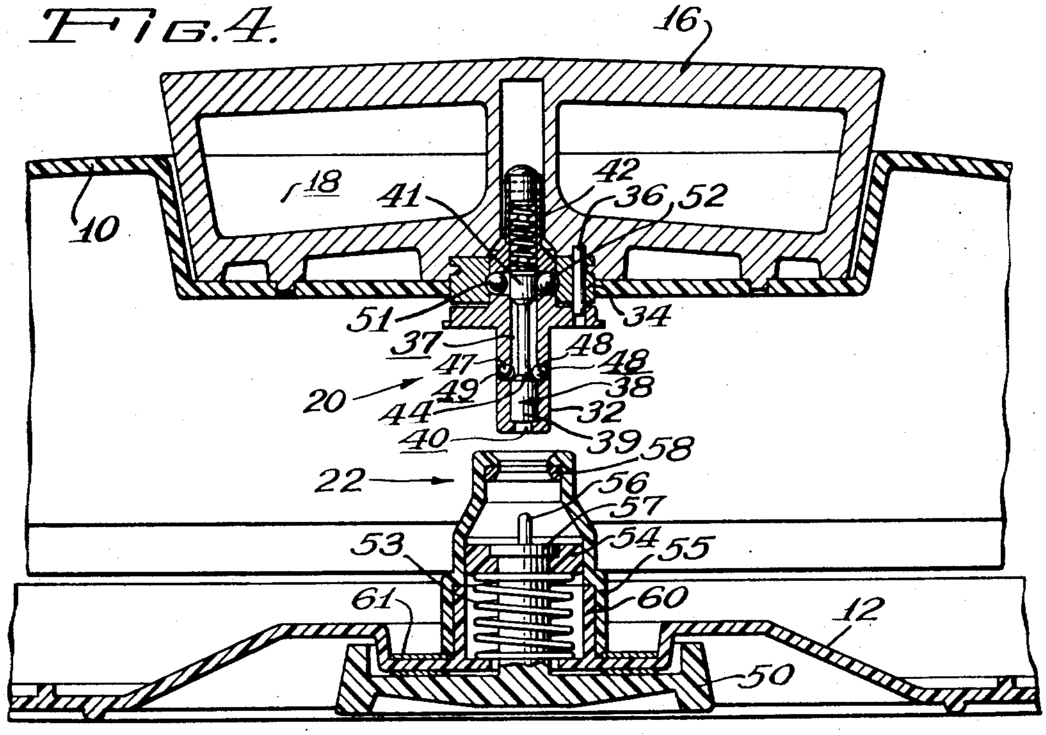
FIG. 4 is an enlarged cross-sectional view of the improved locking mechanism in the unlocked position.

Reference is now made to FIGS. 3 and 4 which illustrate respectively the means for interconnecting the top and bottom covers 10 and 12, respectively, in the closed position in FIG. 3 and in the open position in FIG. 4. The interconnecting means, which comprise the subject matter of this invention, include the male segment 20 attached to the top cover 10 and the female segment 22 attached to the bottom cover 12.

The male segment 20 includes a threaded stainless steel spindle 32. The spindle 32 is attached to a hub 34 in top cover 10 and locked into position by a pin 36 and by a cam pin 38 as described more fully below. The spindle 32 is hollowed out to provide a uniform diameter, cylindrically shaped bore 37 which runs the length of the spindle 32. The lower end of the cylindrical bore 37 in the spindle 32 is restricted so that a spindle cam pin 38 may move freely within the bore 37 of the spindle but not beyond the lower end of the spindle 32.

The spindle cam pin 38 is biased downward toward the opening 40 in the lower end of the hollow 37 by a spindle cam pin biasing spring 42. The spindle cam pin 38 includes a circumferential camming surface 44 adapted to engage retaining elements as at 46 and 47. Surface 44 forces the retaining elements 46 and 47 out through passages defined in the side walls of the spindle 32 as the came pin 38 is displaced upwards in the bore 37.

Contiguous with surface 44 of cam pin 38 is a lower end 39 which has a diameter just slightly less than that of bore 37. Thus the cam pin 38 is freely slidable within bore 37 while the lower end 39 engages retaining elements 46 and 47 holding them in frustoconically shaped passages 48 and 49 in spindle 32. The outside of spindle 32 is coincident with the narrow end frustoconical passages 48 and 49, the narrow end being small enough to prevent retaining elements 46 and 47 from passing through frustoconical passages 48 and 49 respectively.

Cam pin 38 also includes an upper end 41 having the same diameter as the lower end 39 and adapted to continuously engage ball bearing locking elements 51 and 52 which, in turn, engage hub 34 and hold spindle 32 in contact therewith. Pin 36 prevents rotation of spindle 32 within hub 34.

The female segment 22 is comprised of a knob 50 mounted in a knob housing 55 substantially at the center of the bottom cover 12. Housing 55 is press fitted onto a projection 60 of bottom cover 12 and held in position by washer fitting 61. A knob spring 52 engages bottom cover 12 and also engages a washer 54 abutting flange 57 of knob 50. Spring 52 thereby holds knob 50 in position against bottom cover 12. Integrally molded with knob 50 is knob end pin 56 which is adapted to pass through opening 40 in spindle 32 and to engage spindle cam pin 38.

As illustrated in FIG. 3 knob end pin 56 engages spindle cam pin 38 when the male segment 20 is inserted into the female segment 22. This causes camming surface 44 to force retaining element 46 and 47 through passages 48 and 49 in the side walls of spindle 32. Retaining elements 46 and 47 engage a retaining ring 58 mounted in the upper end of housing 55 of female segment 22.

To release the top cover 10 from the bottom cover 12, knob 50 is pulled downward against the force of the biasing knob spring 52. This withdraws the knob end pin 56 from the opening 40. Biasing spring 42 then drives cam pin 38 out of engagement with the retaining elements 46 and 47. Elements 46 and 47 subsequently disengage the retaining ring 58 to thereby allow spindle 32 of male segment 20 to be withdrawn from housing 55 of female segment 22. Knob end biasing spring 52 is stiffer relative to biasing spring 42 to insure that knob end pin 56 will engage and drive cam pin 38 into a locking position when the segments 20 and 22 are mated.

The described invention provides a greatly improved container for computer discs. Threads of the spindle are no longer required to engage a threaded knob with the possible result of creating particles of dust. Further, the top and bottom covers 10 and 12 are locked together to provide a slight tension through the top cover which in turn drives the cover into firm engagement wtih the rubber gasket. This inhibits the passage of any dust into the closed container. In addition, the coupling is effected or disengaged by a quick, easy, straight motion rather than by a constant turning motion as required in prior art containers. This saves time and also eliminates the requirment of aligning the spindle with a knob through the bottom cover. Rather, the segments tend to guide themselves into alignment with one another. Another advantage is the new ease in handling computer disc pack containers and the cumbersome and heavy discs. Whereas formerly two hands were required for opening and closing containers, now a container can be opened and positioned with one hand.

What is claimed is:

1. In a container for receiving a plurality of computer discs, said container being substantially cylindrical in shape and having a separate top cover with a top wall and a side wall and having a separate bottom cover, said top cover including a spindle extending from the central portion of the top wall towards said bottom cover, said bottom cover including a knob housing extending from the central portion of the bottom cover, said knob housing engaging said spindle for holding said container cover in a substantially dust proof, closed condition, the improvement of a locking mechanism for engaging said spindle with said housing, said mechanism comprising a passage in said housing for axially receiving and engaging said spindle, a flange defined in said passage, at least one retaining element carried by said spindle for engaging said flange when said spindle is received in said passage to thereby lock said container in a closed position, a central bore in said spindle, a slidable cam pin in said bore, said cam pin engaging said retaining element for driving said retaining element into position for engaging said flange, means in said bore for baising said cam pin to a position allowing disengagement of said retaining element from said flange for unlocking said container, a knob movably carried by said housing, a knob pin projecting from said knob against the end of said cam pin, means for biasing said knob pin into engagement with said cam pin, said last mentioned biasing means overcoming the biasing force of said first mentioned biasing means so that said cam pin is positioned to hold said retaining element in engagement with said flange, said knob pin being manually displaceable to disengage said cam pin to thereby unlock said container.

2. The improvement of claim 1 wherein said cam pin biasing means include a first biasing spring and said knob pin biasing means include a second biasing spring, said second spring having a relatively greater spring constant than said first spring.

3. The improvement of claim 2 wherein said bore includes a shoulder at the end of said bore opposite said first spring which engages said cam pin and limits the path of travel of said biased cam pin.

4. The improvement of claim 1 wherein said retaining element includes a plurality of retaining balls, each ball being slidably mounted in an element passage in said spindle and connected with said bore, and wherein said flange comprises a retainer ring within said knob housing passage.

5. The improvement of claim 3 wherein said retainer ring includes an inclined surface adapted to engage said balls and force said balls into said element passages in said spindle, said balls simultaneously disengaging said ring when said knob pin is manually displaced and said covers are separated.

References Cited

UNITED STATES PATENTS

| | | | |
|---|---|---|---|
| 2,725,143 | 11/1955 | Linebaugh et al. | 206—62 |
| 3,004,658 | 10/1961 | Rehklau | 206—52 |
| 3,154,193 | 10/1964 | Alden | 206—52 |
| 3,176,281 | 3/1965 | Pattison | 340—174.1 |
| 3,370,698 | 2/1968 | Geier | 206—52 |

WILLIAM T. DIXSON, Jr., Primary Examiner

U.S. Cl. X.R.

206—52; 220—55; 340—174.1